United States Patent
Makisumi (10) Patent No.: US 12,011,831 B2
(45) Date of Patent: Jun. 18, 2024

(54) ROTATION MECHANISM AND ROBOT

(71) Applicant: Nabtesco Corporation, Tokyo (JP)

(72) Inventor: Kazuyoshi Makisumi, Tokyo (JP)

(73) Assignee: Nabtesco Corporation, Tokyo (JP)

( * ) Notice: Subject to any disclaimer, the term of this patent is extended or adjusted under 35 U.S.C. 154(b) by 0 days.

(21) Appl. No.: 17/983,888

(22) Filed: Nov. 9, 2022

(65) Prior Publication Data

US 2023/0166393 A1 Jun. 1, 2023

(30) Foreign Application Priority Data

Nov. 26, 2021 (JP) ................. 2021-192165

(51) Int. Cl.
  *B25J 9/10* (2006.01)
  *F16H 1/32* (2006.01)
(52) U.S. Cl.
  CPC ............... *B25J 9/102* (2013.01); *F16H 1/32* (2013.01); *F16H 2001/323* (2013.01)
(58) Field of Classification Search
  CPC ...... B25J 9/102; F16H 1/32; F16H 2001/323; F16H 2001/325
  See application file for complete search history.

(56) References Cited

U.S. PATENT DOCUMENTS

| 2006/0100046 A1* | 5/2006 | Fuse ................... G03G 15/754 |
| | | 474/101 |
| 2010/0113206 A1* | 5/2010 | Wang ...................... F16H 1/32 |
| | | 475/180 |
| 2017/0335944 A1* | 11/2017 | Nishimura ............ F16H 57/082 |
| 2018/0291995 A1* | 10/2018 | Hayashibara ............. F16H 1/32 |
| 2019/0264780 A1 | 8/2019 | Tamura et al. |

FOREIGN PATENT DOCUMENTS

| JP | 2018-017362 A | 2/2018 |
| JP | 6327910 B2 | 5/2018 |
| JP | 2019-044936 A | 3/2019 |

OTHER PUBLICATIONS

Partial European Search Report dated Apr. 17, 2023, issued in corresponding European Patent Application No. 22206400.8 (14 pgs.).

* cited by examiner

*Primary Examiner* — Edwin A Young
(74) *Attorney, Agent, or Firm* — Pillsbury Winthrop Shaw Pittman, LLP (57) ABSTRACT

A speed reducing mechanism according to one embodiment includes an output shaft, carriers each of which has an output shaft hole, and oscillating gears each of which has an output shaft insertion hole. The output shaft is inserted in the output shaft hole and the output shaft insertion hole and contacts the inner peripheral surfaces. The surface roughness Ra of the inner peripheral surfaces defining the output shaft hole and output shaft insertion hole is equal to or less than 1.6 μm. The static friction coefficient of the inner peripheral surfaces against the output shaft is equal to or less than 0.2.

16 Claims, 3 Drawing Sheets

ROTATION MECHANISM AND ROBOT

CROSS-REFERENCE TO RELATED APPLICATIONS

This application is based on and claims the benefit of priority from Japanese Patent Application Serial No. 2021-192165 (filed on Nov. 26, 2021), the contents of which are hereby incorporated by reference in its entirety.

TECHNICAL FIELD

The present disclosure relates to a rotation mechanism and a robot.

BACKGROUND

As one type of robot, a cooperative robot that shares a work space with workers have been known. For example, a multi-joint cooperative robot, which is one of such cooperative robots, is provided with a speed reducing mechanism that serves as a rotation mechanism at a joint where two arms of the robot are connected to each other. The multi-joint cooperative robot and the like is provided with an electric motor or the like that imparts rotational force to the speed reducing mechanism. By decelerating and outputting the rotational force of the electric motor, one of the two arms is given a larger output torque relative to the other of the two arms.

As the speed reducing mechanism, for example, an eccentric oscillating speed reducing mechanism with high rotational position accuracy and high load resistance is used. This type of speed reducing mechanism includes, for example, a housing having an internal gear formed on its inner peripheral surface, an oscillating gear (external gear) meshed with the internal gear and oscillatory rotated, an input crankshaft (first rotating portion) that has an eccentric portion (eccentric body) rotatably supporting the oscillating gear and that transmits a rotational force to the oscillating gear, an output shaft (carrier pin) that transmits a rotational force of the oscillating gear, and a support member (carrier) connected to the output shaft. The support member is rotatably supported by the housing via a slide bearing. The output shaft is press-fitted into a hole (press-fitted hole) formed in the support member and formed integrally with the support member. Thus, when the rotational force of the oscillating gear is transmitted to the output shaft, the support member rotates relative to the housing (for example, see Japanese Patent Application Publication No. 2018-17362).

However, in the conventional art described above, the output shaft is press-fitted into the support member, which increases the assembly work and disassembly work of the speed reducing mechanism. Further, since the output shaft is not freely rotated relative to the support member, the PV limits of the support member and the output shaft become low, and troubles such as seizure of the support member and the output shaft may occur. For this reason, it is difficult to stably operate the speed reducing mechanism, and there is a possibility that the product life of the speed reducing mechanism is shortened.

SUMMARY

The present disclosure provides a rotation mechanism and robot for which assembly and disassembly work efficiency can be improved and that can provide the stable operation and extended product life.

A rotation mechanism according to one aspect of the disclosure includes: a shaft; and a rotating member having a shaft insertion hole in which the shaft is inserted, the shaft contacting an inner peripheral surface of the rotating member. The rotating member freely rotates relative to the shaft. The surface roughness Ra of the inner peripheral surface is equal to or less than 1.6 μm, and the static friction coefficient of the inner peripheral surface against the shaft is equal to or less than 0.2.

By configuring in this way, it is possible to improve work efficiency in assembling and disassembling the rotating member and the shaft. The surface roughness Ra of the inner peripheral surface of the rotating member is set to 1.6 μm or less, and the static friction coefficient of the inner peripheral surface of the rotating member against the shaft is set to 0.2 or less. Therefore, the sliding resistance of the shaft against the rotating member can be reduced, and the PV limit of the rotating member can be increased. Consequently, the speed reducing mechanism can be stably operated, which extends the product life.

In the above configuration, a portion of the rotating member where at least includes the inner peripheral surface and surrounds the shaft may be made of resin. The shaft may be made of metal.

In the above configuration, further included are an internal gear having internal teeth; an oscillating gear having external teeth meshing with the internal teeth and being oscillatory rotated; an input crankshaft having an eccentric portion that rotatably supports the oscillating gear; an output shaft to which a rotational force of the oscillating gear is transmitted; and a support member rotatably supporting each axial end portion of the output shaft. The input crankshaft transmits a rotational force to the oscillating gear, and the shaft includes the output shaft. The rotating member includes the oscillating gear and the support member. The shaft insertion hole may include a gear-side shaft hole formed in the oscillating gear and a support member-side shaft hole formed in the support member.

In the above configuration, a shim may be provided on at least one of two axial end portions of the output shaft. The shim helps axial positioning of the output shaft.

The shim may include an elastic shim that is elastically deformable.

In the above configuration, the shim may have an annular spacer into which the output shaft is inserted.

In the above configuration, the internal gear includes: a cylindrical case; and a plurality of internal tooth pins arranged on an inner peripheral surface of the case along a circumferential direction. The thermal conductivity of the case may be higher than the thermal conductivity of the oscillating gear.

In the above configuration, the internal gear includes: a cylindrical case; and a plurality of internal tooth pins arranged on an inner peripheral surface of the case along a circumferential direction. The thermal conductivity of the case is higher than the thermal conductivity of the internal tooth pins.

A rotation mechanism according to another aspect of the disclosure includes: an internal gear having internal teeth; an oscillating gear being oscillatory rotated, the oscillating gear being made of resin; an input crankshaft transmitting a rotational force to the oscillating gear, the input crankshaft being made of metal; an output shaft to which a rotational force of the oscillating gear is transmitted, the output shaft being made of metal; and a support member supporting each axial end portion of the output shaft rotatably, the support member being made of resin. The oscillating gear has external teeth that mesh with the internal teeth of the internal gear, and the input crankshaft may have an eccentric portion that rotatably supports the oscillating gear.

When the eccentric oscillating-type speed reducing mechanism is adopted as the rotation mechanism, this configuration can easily reduce the static friction coefficient of the inner peripheral surfaces defining the gear-side shaft hole and the support member-side shaft hole against the output shaft. It is also possible to easily increase the PV limit of the oscillating gear and the supporting member. Consequently, the speed reducing mechanism can be stably operated, which extends the product life. By forming the output shaft of metal, the rigidity of the output shaft can be increased, and thereby the rotation mechanism can be operated more stably, and the product life can be further extended.

A robot according to yet another aspect of the disclosure includes: a first member and a second member; and a rotation mechanism provided between the first member and the second member. The rotation mechanism rotates the second member relative to the first member. The rotation mechanism includes: an internal gear having internal teeth; an oscillating gear being oscillatory rotated, the oscillating gear being made of resin; an input crankshaft transmitting a rotational force to the oscillating gear, the input crankshaft being made of metal; an input crankshaft transmitting a rotational force to the oscillating gear, the input crankshaft being made of metal; and a support member supporting each axial end portion of the output shaft rotatably, the support member being made of resin. The oscillating gear has external teeth that mesh with the internal teeth of the internal gear. The input crankshaft may have an eccentric portion that rotatably supports the oscillating gear.

By configuring in this way, it is possible to provide a robot capable of stably operating and its product life is extended.

The rotation mechanism and robot for which assembly and disassembly work efficiency can be improved and that can provide the stable operation and extended product life.

DESCRIPTION OF THE EMBODIMENTS

The following describes embodiments of the present disclosure with reference to the drawings.

<Cooperative Robot>

Figure 1:
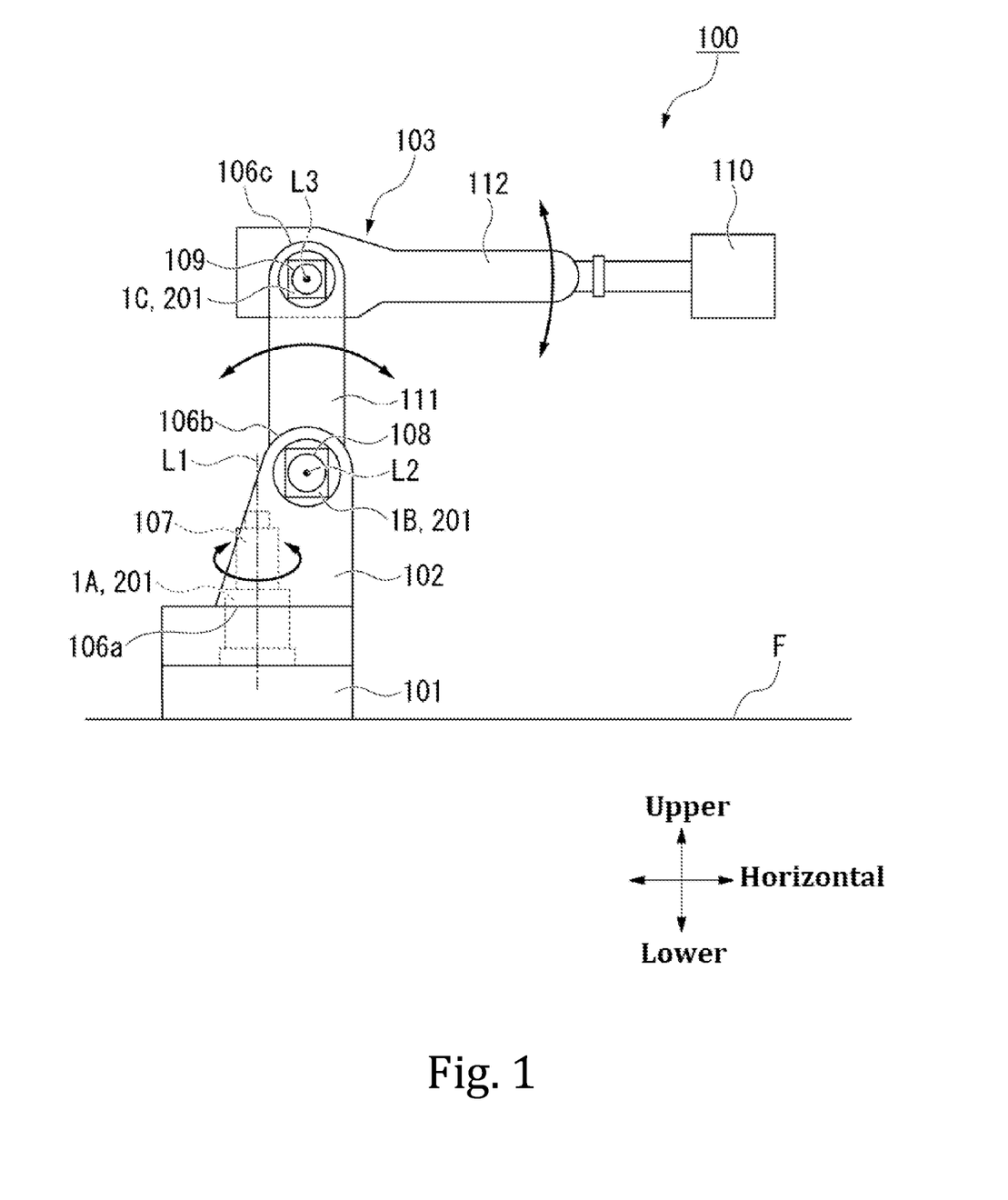
FIG. 1 schematically illustrates a configuration of a cooperative robot according to an embodiment of the disclosure.

FIG. 1 schematically shows the configuration of a cooperative robot 100. In the following description, the vertical and horizontal directions of the cooperative robot 100 are defined as the vertical and horizontal directions when the cooperative robot 100 is placed on an installation surface F.

As shown in FIG. 1, the cooperative robot 100 includes a base portion 101 (an example of a first member or a second member in the claims) placed on an installation surface F, a rotating head 102 (an example of the first member or the second member in the claims), and an arm unit 103 (an example of the first member or the second member in the claims) rotatably attached to the top of the rotating head 102 (the example of the first member or the second member in the claims). The cooperative robot 100 further includes: speed reducing mechanisms 1A, 1B, and 1C (first speed reducing mechanism 1A, second speed reducing mechanism 1B, and third speed reducing mechanism 1C) provided in joint portions 106a, 106b, and 106c (first joint portion 106a, second joint portion 106b, and third joint portion 106c) of the base portion 101, the rotating head 102, and the arm unit 103; servomotors 107, 108 and 109 (first servomotor 107, second servomotor 108, and third servomotor 109) as drive sources; and an end effector 110 attached to the arm unit 103.

The rotating head 102 is coupled to the base portion 101 such that it is rotatable around a first rotation axis L1. This coupling portion is the first joint portion 106a. The first speed reducing mechanism 1A and the first servomotor 107 are coupled to the first joint portion 106a. The first rotation axis L1 coincides with, for example, the vertical direction. Rotation of the first servomotor 107 is transmitted to the rotating head 102 via the first speed reducing mechanism 1A. In this way, the rotating head 102 is rotationally driven relative to the base portion 101 around the first rotation axis L1.

The arm unit 103 includes, for example, two arms 111 and 112 (first arm 111 and second arm 112) that extend in one direction. One end of the first arm 111 of the two arms 111 and 112 is coupled to the upper portion of the rotating head 102 such that it is rotatable about a second rotation axis L2. This coupling portion is the second joint portion 106b, and the second speed reducing mechanism 1B and the second servomotor 108 are coupled to the second joint portion 106b.

The second rotation axis L2 coincides with, for example, the horizontal direction. Rotation of the second servomotor 108 is transmitted to the first arm 111 via the second speed reducing mechanism 2. In this way, the first arm 111 is rotationally driven relative to the rotating head 102 around the second rotation axis L2. For example, the first arm 111 is driven to move swingably in the front and rear directions relative to the base portion 101.

One end of the second arm 112 of the two arms 111 and 112 is coupled to the other end of the first arm 111 such that it is rotatable around a third rotation axis L3. This coupling portion is the third joint portion 106c, and the third speed reducing mechanism 1C and the third servomotor 109 are coupled to the third joint portion 106c. The third rotation axis L3 coincides with, for example, the horizontal direction. Rotation of the third servomotor 109 is transmitted to the second arm 112 via the third speed reducing mechanism 1C. In this way, the second arm 112 is rotationally driven relative to the first arm 111 about the third rotation axis L3. For example, the second arm 112 is driven to move swingable in the upper and lower directions relative to the first arm 111.

The end effector 110 is coupled to the other end of the second arm 112. By driving the rotating head 102, the first arm 111, and the second arm 112, the end effector 110 is three-dimensionally driven.

The base portion 101, the rotating head 102, the first arm 111, and the second arm 112 of the cooperative robot 100 are made of, for example, an aluminum alloy. The thermal conductivity of the aluminum alloy is about 201 [W/m·K]. Alternatively, they may be made of, for example, a magnesium alloy, carbon fiber reinforced plastic (CFRP), or a resin containing boron nitride to increase the thermal conductivity. The thermal conductivity of the magnesium alloy is, for example, about 51.2 [W/m·K].

First Embodiment

<Speed Reducing Mechanism>

The speed reducing mechanism 1A to 1C will be now described with reference to FIG. 2. The basic configuration of each speed reducing mechanism 1A-1C is the same. Therefore, only the second speed reducing mechanism 1B among the speed reducing mechanisms 1A to 1C will be hereunder described, and description of the first speed reducing mechanism 1A and the third speed reducing mechanism 1C will be omitted.

Figure 2:
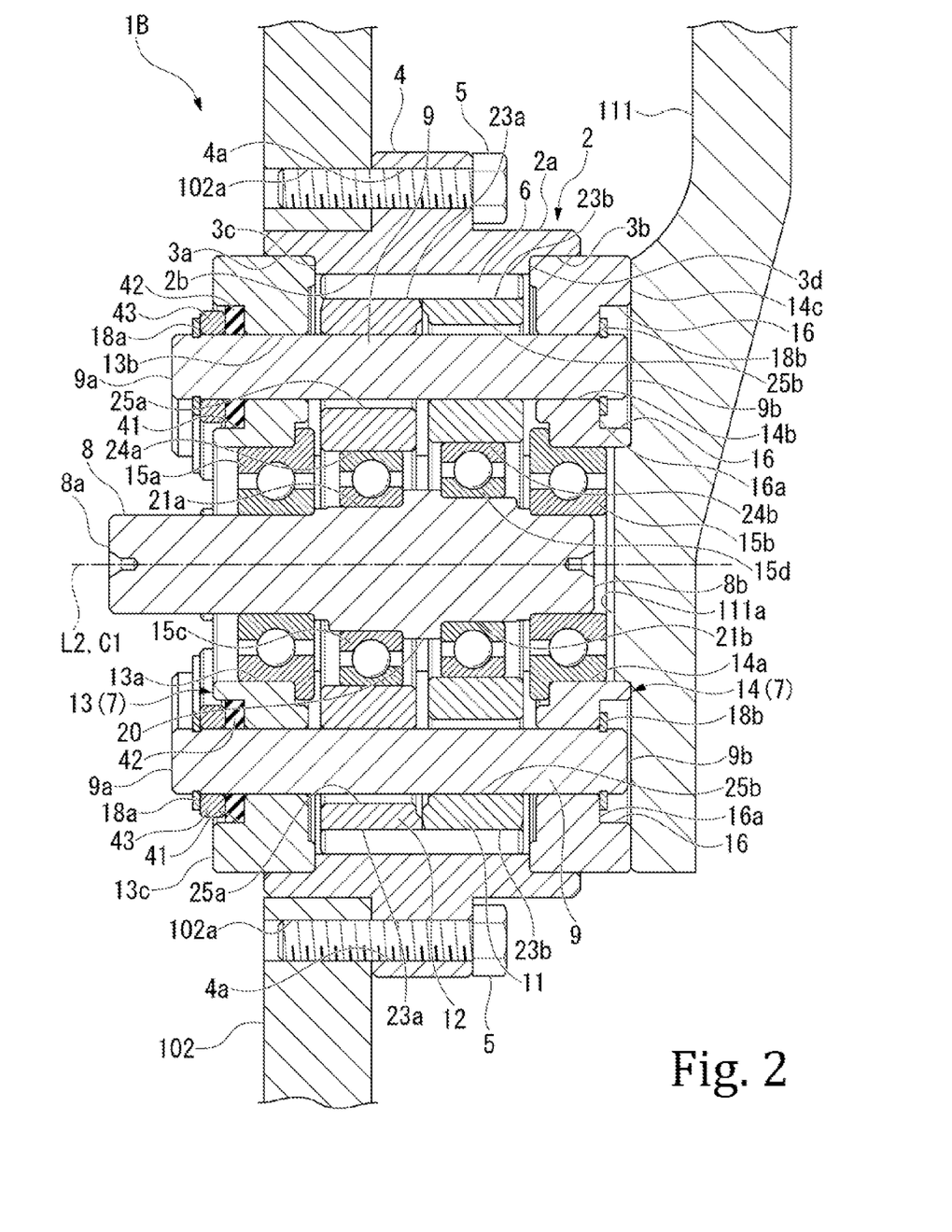
FIG. 2 schematically illustrates a configuration of a second speed reducing mechanism in a first embodiment of the disclosure.

FIG. 2 schematically shows the configuration of the second speed reducing mechanism 1B. As shown in FIG. 2, the second speed reducing mechanism 1B is a so-called eccentric oscillating-type speed reducing mechanism. The second speed reducing mechanism 1B includes a cylindrical case 2 (an example of an internal gear in the claims), a carrier 7 (an example of a support member in the claims) rotatably supported by the case 2, an input crankshaft 8 rotatably supported by the carrier 7, a plurality of (for example, three) output shafts 9, and oscillating gears 11 and 12 (first oscillating gear 11 and second oscillating gear 12) rotatably supported by the input crankshaft 8.

A central axis C1 of the case 2 coincides with the second rotation axis L2. In the following description, the direction parallel to the second rotation axis L2 may be referred to as an axial direction, the circumferential direction of the second rotation axis L2 may be referred to as a circumferential direction, and the direction orthogonal to the axial direction and the circumferential direction may be referred to as a radial direction.

The case 2 is made of, for example, an aluminum alloy. Alternatively, the case 2 may be made of, for example, a magnesium alloy, carbon fiber reinforced plastic (CFRP), a resin containing boron nitride to increase thermal conductivity, or the like. The thermal conductivity of the case 2 is preferably higher than the thermal conductivity of the internal tooth pin 6, which will be described later. On the outer circumferential surface of the case 2, an outer flange portion 4 projecting outward in the radial direction is integrally formed in the axially middle portion of the case 2. The outer flange portion 4 has a rectangular section along the axial direction.

The outer flange portion 4 has a plurality of bolt holes 4a that penetrate therethrough in the axial direction and are arranged at equal intervals in the circumferential direction. For example, the rotating head 102 overlaps the outer flange portion 4 from the outside in the axial direction. A bolt 5 is inserted into each bolt hole 4a from the side opposite to the rotating head 102 of the outer flange portion 4. The case 2 is fixed to the rotating head 102 by fastening the bolt 5 into a female thread portion 102a of the rotating head 102.

On both sides in the axial direction of the inner peripheral surface 2b of the case 2, radially enlarged portions 3a and 3b (first radially enlarged portion 3a and second radially enlarged portion 3b) are formed with stepped portions 3c, 3d (first stepped portion 3c and second stepped portion 3d) interposed therebetween, respectively. The inner diameters of the radially enlarged portions 3a and 3b are larger than the inner diameter of the inner peripheral surface 2b of the case 2. The carrier 7 is provided on each of the radially enlarged portions 3a and 3b.

A plurality of internal tooth pins 6 (an example of the internal gear in the claims) are provided on the inner peripheral surface 2b of the case 2 between the two stepped portions 3c and 3d. Each of the internal tooth pins 6 is formed of, for example, metal. Alternatively, the internal tooth pins 6 may be made of a high-thermal-conductivity resin, a non-metallic material, or the like. The internal tooth pins 6 may be made of a resin containing carbon nanotubes (CNT) or boron nitride nanotubes (BNNT). The internal tooth pins 6 may be made of ferrous metal such as bearing steel. The internal tooth pins 6 may be made of carbon fiber reinforced plastic (CFRP).

Each of the internal tooth pins 6 is shaped like a column. The configuration of the internal tooth pin 6 is not limited this, but it may be a hollowed member. Each of the internal tooth pins 6 may have a multi-layered structure with a core material being wrapped in a surface material. For example, one of the core and surface material of the internal tooth pin 6 may be made of an iron-based metal, and the other may be made of a copper- or aluminum-based metal. Such a structure can eliminate the trade-off between the mechanical and thermal characteristics. As yet another example of the configuration of the internal tooth pin 6, one of the core and surface material may be made of metal and the other may be made of resin. The internal tooth pins 6 may be made of sintered metal.

The axial direction of the internal tooth pins 6 coincides with the central axis C1 of the case 2. The internal tooth pins 6 are arranged at regular intervals in the circumferential direction. The internal tooth pins 6 serve as internal teeth that mesh with the oscillating gears 11 and 12.

The carrier 7 includes a first carrier (shaft flange) 13 provided in the first radially enlarged portion 3a situated closer to the rotating head 102 among the two radially enlarged portions 3a and 3b formed in the case 2, and a second carrier (hold flange) 14 provided in the second radially enlarged portion 3b situated opposite to the first radially enlarged portion 3a in the axial direction. Each of the carriers 13 and 14 is formed in a disc shape. The outer peripheral surfaces of the carriers 13 and 14 are slidably fitted to the radially enlarged portions 3a and 3b, respectively. The carriers 13 and 14 are arranged and fixed in the axial direction by abutting against the corresponding stepped portions 3c and 3d.

The carriers 13 and 14 are made of resin, for example. For example, the carriers 13 and 14 may be made of POM (polyacetal). Each of the carriers 13 and 14 may be formed of a resin different from POM, such as PAEK (Polyaryl Ether Ketones) typified by PEEK (Poly Ether Ketone). The resin may be PPS (Polyphenylene sulfide) or a resin containing PPS. The carriers 13 and 14 may be formed of carbon fiber reinforced plastic (CFRP). For example, the thermal conductivity of PPS is about 0.2 [W/m·K]. The thermal conductivity of PPS containing boron nitride is, for example, about 2.6 [W/m·K]. It is preferable that the linear expansion coefficient of each carrier 13, 14 is, for example, greater than that of aluminum alloy (23 to 24 ($\times 10^{-6}$/° C.)).

Input shaft holes 13a and 14a that penetrate the carriers 13 and 14, respectively, in the radial direction are formed at the radial center of the carriers 13 and 14. The input crankshaft 8 is inserted into the input shaft holes 13a and 14a. Bearings 15a and 15b (first bearing 15a and second bearing 15b) are provided in the input shaft holes 13a and 14a, respectively. Ball bearings, for example, are used as the bearings 15a and 15b. The input crankshaft 8 is rotatably supported by the carriers 13 and 14 via the bearings 15a and 15b. The rotation axis of the input crankshaft 8 coincides with the central axis C1 of the case 2 (second rotation axis L2).

A plurality of (for example, three) output shaft holes 13b and 14b (an example of shaft insertion holes, support member-side shaft holes) are formed at equal intervals in the circumferential direction around the input shaft holes 13a and 14a in each of the carriers 13 and 14, respectively. An output shaft 9 is inserted into the output shaft holes 13b and 14b. A surface roughness Ra of the inner peripheral surfaces of the carriers defining the output shaft holes 13b and 14b is equal to or lower than 1.6 μm. The static friction coefficient of the inner peripheral surfaces of the carriers defining the output shaft holes 13b and 14b against the output shaft 9 is equal to or lower than 0.2.

Among the two carriers 13 and 14, a shim receiving concave portion 41 is formed coaxially with the output shaft hole 13b in a surface 13c of the first carrier 13 facing away from the second carrier 14. The shim receiving recess 41 opens on the surface 13c side and communicates with the output shaft hole 13b.

An annular elastic shim 42 (an example of a shim in the claims) is received in the shim receiving recess 41. The inner diameter of the elastic shim 42 is approximately the same as or slightly larger than the inner diameter of the output shaft hole 13b. The elastic shim 42 is made of rubber or the like and elastically deforms. The elastic shim 42 may be made of a material other than rubber, provided that it is made of an elastically deformable material. For example, a wave washer may be used as the elastic shim 42 instead of rubber.

An annular spacer 43 (an example of the shim in the claims) is disposed on the elastic shim 42. The inner diameter of the spacer 43 is approximately the same as or slightly larger than the inner diameter of the output shaft hole 13b. The spacer 43 is formed of, for example, metal. The elastic shim 42 and the spacer 43 are provided for positioning the output shaft 9 with respect to the carriers 13 and 14 (details will be described later).

Among the two carriers 13 and 14, a concave portion 16 is formed coaxially with the output shaft hole 14b in a surface 14c of the second carrier 14 on the side opposite to the first carrier 13. The concave portion 16 opens on the side of the surface 14c and communicates with the output shaft hole 14b. The concave portion 16 may be filled with grease (not shown), for example. The grease is used to release heat transferred to the output shaft 9. The grease has the thermal conductivity higher than those of the oscillating gears 11 and 12 and the second carrier 14. The thermal conductivity of the grease is 5 [W/m·K] or greater.

The output shaft 9 inserted in the output shaft holes 13b and 14b is made of, for example, an aluminum alloy. The output shaft 9 is not limited to the aluminum alloy, and may be made of stainless steel instead. The thermal conductivity of the stainless steel is about 16.7 [W/m·K]. Alternatively, the output shaft 9 may be made of a ferrous metal, for example. As the ferrous metal, carbon steel, bearing steel, etc. may be used depending on desired properties. For example, the thermal conductivity of S45C as iron is about 45 [W/m·K].

A first end portion 9a of the output shaft 9 on the first carrier 13 side protrudes slightly from a surface 13c of the first carrier 13 facing away from the second carrier 14. The elastic shim 42 and the spacer 43 are attached to the first end portion 9a of the output shaft 9. A first retaining ring 18a is provided on the spacer 43 at the first end portion 9a of the output shaft 9. Axial movement of the output shaft 9 toward the second carrier 14 is restricted by the first retaining ring 18a that abuts against the spacer 43.

A second end portion 9b of the output shaft 9 on the second carrier 14 side is situated slightly lower than the surface 14c of the second carrier 14. That is, the second end portion 9b of the output shaft 9 is received in the concave portion 16 of the second carrier 14. A second retaining ring 18b is provided on the second end portion 9b of the output shaft 9. The second retaining ring 18b is also received in the concave portion 16. Axial movement of the output shaft 9 toward the first carrier 13 is restricted by the second retaining ring 18b abutting against a bottom surface 16a of the concave portion 16.

That is, the elastic shim 42, the spacer 43, and the retaining rings 18a and 18b help positioning of the output shaft 9 relative to the carriers 13 and 14. Among them, the elastic shim 42 and the spacer 43 have the function of absorbing manufacturing errors of the case 2, the carriers 13 and 14, and the output shaft 9 and, adjusting the position of the output shaft 9 relative to the carriers 13 and 14. Specifically, the axial thickness of the elastic shim 42 and spacer 43 are adjusted depending on the amount of play of the output shaft 9 in the axial direction against the carriers 13 and 14 to reduce the play of the output shaft 9 against the carriers 13 and 14. The play is a space that allows the output shaft 9 to move in the axial direction relative to the carriers 13 and 14, and caused by manufacturing errors of the case 2, the carriers 13 and 14, and the output shaft 9.

The axial thickness of the elastic shim 42 is determined such that the elastic shim 42 is slightly compressed when fitted in the case. Thus, the first carrier 13 is biased toward the second carrier 14 by a restoring force of the elastic shim 42 fitted in the case. This prevents the carriers 13 and 14 and the output shaft 9 from moving and they can be stably secured. Even if the axial play of the output shaft 9 relative to the carriers 13 and 14 increases due to aged deterioration or the like, this play can be absorbed by the elastic shims 42. By biasing the first carrier 13 toward the second carrier 14 side, preload can be applied to the bearings 15a and 15b disposed in the input shaft holes 13a and 14a of the carriers 13 and 14, respectively.

Since the axial movement of the output shaft 9 relative to the carriers 13 and 14 is restricted, in other words, the axial movement of the carrier 13 and 14 is restricted. Thus, the carriers 13 and 14 are kept being fitted to the corresponding radially enlarged portions 3a and 3b of the case 2, respectively. In this way, the carriers 13 and 14 and the output shafts 9 are integrated. Each output shaft 9 is inserted in the output shaft holes 13b and 14b of the carriers 13 and 14, thus the output shafts 9 are arranged around the input crankshaft 8. The input crankshaft 8, like the output shafts 9, is made of, for example, an aluminum alloy. Alternatively, similar to the output shaft 9, the input crankshaft 8 may be made of, for example, stainless steel or various ferrous metals.

A first end portion 8a of the input crankshaft 8 on the first carrier 13 side protrudes axially outward through the first bearing 15a provided in the first carrier 13. The second servomotor 108 is connected to the first end portion 8a. The rotation of the second servomotor 108 is transmitted to the input crankshaft 8.

A second end 8b of the input crankshaft 8 on the second carrier 14 side is situated substantially flush with the end surface of the second bearing 15b provided in the second carrier 14 that faces away from the first carrier 13. The input crankshaft 8 has a first eccentric portion 21a and a second eccentric portion 21b arranged axially between the bearings 15a and 15b provided in the carriers 13 and 14, respectively. The input crankshaft 8 is formed with a radially enlarged portion 20 that has a larger diameter than the eccentric portions 21a and 21b and is disposed between the eccentric portions 21a and 21b.

The first eccentric portion 21a is situated on the first carrier 13 side. The second eccentric portion 21b is situated on the second carrier 14 side. Each eccentric portion 21a, 21b is provided eccentrically with reference to the second rotation axis L2. The eccentric portions 21*a* and 21*b* are out of phase with each other. For example, the eccentric portions 21*a* and 21*b* are out of phase with each other by 180°.

The bearings 15*c* and 15*d* (third bearing 15*c* and fourth bearing 15*d*) are provided on the eccentric portions 21*a* and 21*b*, respectively. Ball bearings, for example, are used for these bearings 15*c* and 15*d* as well as the first bearing 15*a* and the second bearing 15*b*. The axial distance between the bearings 15*c* and 15*d* is limited by abutment of the axial end surfaces of the bearings 15*c* and 15*d* against the radially enlarged portion 20. The oscillating gears 11 and 12 (first oscillating gear 11 and second oscillating gear 12) are rotatably supported by the eccentric portions 21*a* and 21*b* via the bearings 15*c* and 15*d*, respectively.

The two oscillating gears 11 and 12 are made of, for example, resin. For example, the oscillating gears 11 and 12 may be made of POM (polyacetal). Similarly to the material for the carriers 13 and 14 described above, various resins can be used for the oscillating gears 11 and 12. Since the oscillating gears 11 and 12 are made of resin, the thermal conductivity of the output shaft 9 and the thermal conductivity of the input crankshaft 8 are higher than the thermal conductivity of the oscillating gears 11 and 12. The thermal conductivity of the case 2 is higher than the thermal conductivity of the oscillating gears 11 and 12. The thermal conductivity of the internal tooth pins 6 is higher than that of the oscillating gears 11 and 12.

The two oscillating gears 11 and 12 are arranged at a prescribed distance from each other between the two carriers 13 and 14. At the radial center of the two oscillating gears 11 and 12, formed are crankshaft insertion holes 24*a* and 24*b* (first crankshaft insertion hole 24*a* and second crankshaft insertion hole 24*b*) that penetrate the oscillating gears 11 and 12 in the thickness direction and receive outer peripheral surfaces of the bearings 15*c* and 15*d*, respectively. In this way, the oscillating gears 11 and 12 are rotatably supported by the eccentric portions 21*a* and 21*b* via the bearings 15*c* and 15*d*. The eccentric portions 21*a* and 21*b* cause the oscillating gears 11 and 12 to oscillatory rotate.

External teeth 23*a* and 23*b* that mesh with the internal tooth pins 6 provided on the case 2 are formed on the outer peripheral portions of the oscillating gears 11 and 12, respectively. The number of the external teeth 23*a*, 23*b* is smaller than the number of the internal tooth pins 6 by, for example, one. The two oscillating gears 11 and 12 have output shaft insertion holes 25*a* and 25*b* (first output shaft insertion hole 25*a* and second output shaft insertion hole 25*b*; an example of a shaft insertion hole and an example of a gear-side shaft hole in the claims), respectively, at positions corresponding to the output shaft 9. The inner diameters of the output shaft insertion holes 25*a* and 25*b* are large enough to allow the oscillatory rotation of the oscillating gears 11 and 12 with the output shaft 9 inserted in the output shaft insertion holes 25*a* and 25*b*. The surface roughness Ra of inner peripheral surfaces of the oscillating gears defining the output shaft insertion holes 25*a* and 25*b* is equal to or less than 1.6 μm. The static friction coefficient of the inner peripheral surfaces of the output shaft insertion holes 25*a* and 25*b* against the output shaft 9 equal to or less than 0.2.

Of the two carriers 13 and 14 of the second speed reducing mechanism 1B configured in this way, the first arm 111, for example, is disposed on the surface 14*c* of the second carrier 14 that faces away from the first carrier 13. The first arm 111 is fixed to the first carrier 13 with bolts (not shown). The first arm 111 is formed with a convex portion 111*a* that fits into the input shaft hole 14*a* of the second carrier 14. By fitting the convex portion, the first arm 111 is positioned with respect to the second carrier 14 in the radial direction. The convex portion 111*a* protrudes to such an extent that it faces the second bearing 15*b* and the second end portion 8*b* of the input crankshaft 8 with a minute gap therebetween.

<Operation and Action of Second Speed Reducing Mechanism>

Next, the operation and action of the second speed reducing mechanism 1B will be described. By driving the second servomotor 108, the input crankshaft 8 is rotated. With the rotation of the crankshaft, the oscillating gears 11 and 12 rotatably supported by the eccentric portions 21*a* and 21*b* are oscillatory rotated. A part of the external teeth 23*a* and 23*b* of the oscillating gears 11 and 12 then mesh with the internal tooth pins 6 of the case 2.

At this time, the meshing positions of the external teeth 23*a* and 23*b* with the internal tooth pins 6 (case 2) are sequentially displaced in the circumferential direction since the number of teeth of each of the external teeth 23*a* and 23*b* is less than the number of the internal tooth pins 6 by, for example, one. Thus, the oscillating gears 11 and 12 rotate. This rotation is decelerated relative to the rotation of the input crankshaft 8.

The output shaft 9 is inserted in the output shaft insertion holes 25*a* and 25*b* of the oscillating gears 11 and 12. When the oscillating gears 11 and 12 rotate, the rotational force of the oscillating gears 11 and 12 in the rotational direction is transmitted to the output shafts 9. Each output shaft 9 is rotatably supported by the carriers 13 and 14. Thus, the rotational force of the oscillating gears 11 and 12 is transmitted to the carriers 13 and 14.

The outer peripheral surfaces of the carriers 13 and 14 are slidably fitted to the corresponding radially enlarged portions 3*a* and 3*b* of the case 2. Thus, each carrier 13 and 14 is rotated relative to the case 2. That is, the rotation of the second servomotor 108 is decelerated and outputted to the carrier 7 (the first carrier 13 and second carrier 14). The rotating head 102 is fixed to the case 2. The first arm 111 is fixed to the second carrier 14 among the carriers 13 and 14. Thus, the first arm 111 is rotated around the second rotation axis L2 relative to the rotating head 102.

For example, when the rotation of the first arm 111 (the second carrier 14) is restricted, the rotation of the second servomotor 108 is decelerated and outputted to the case 2. In this case, the rotating head 102 is rotated around the second rotation axis L2 relative to the first arm 111. That is, the speed reducing mechanisms 1A to 1C restrict the rotation of either the case 2 or the carrier 7, so that the other of the case 2 and the carrier 7 serves as the output for the servomotors 107 to 109. This operation principle also applies to the first speed reducing mechanism 1A and the third speed reducing mechanism 1C.

The output shaft 9 and the carriers 13 and 14 are integrated by the output shaft 9 inserted in the output shaft holes 13*b* and 14*b* formed in the carriers 13 and 14, respectively. Thus, the output shaft 9 is freely rotated relative to the carriers 13 and 14. Moreover, by forming the carriers 13 and 14 of resin, the output shaft 9 can be rotatably supported by the carriers 13 and 14 without providing bearings separately from the carriers 13 and 14.

The surface roughness Ra of the inner peripheral surfaces of the carriers defining the output shaft holes 13*b* and 14*b*, respectively, is equal to or lower than 1.6 μm. The static friction coefficient of the inner peripheral surfaces of the carriers defining the output shaft holes 13*b* and 14*b* against the output shaft 9 is equal to or lower than 0.2. Thus, the sliding resistance of the output shaft 9 against the carriers 13 and 14 can be reduced, and therefore the output shaft 9 can be smoothly rotated relative to the carriers 13 and 14.

The same can be said for the relation between the oscillating gears 11 and 12 and the output shaft 9. That is, the oscillating gears 11 and 12 are made of, for example, resin. The surface roughness Ra of the inner peripheral surfaces the oscillating gears 11 and 12 defining the output shaft insertion holes 25a and 25b, respectively, is equal to or less than 1.6 μm. The static friction coefficient of the inner peripheral surfaces of the output shaft insertion holes 25a and 25b against the output shaft 9 equal to or less than 0.2. Therefore, the output shaft 9 is smoothly brought into contact with the oscillating gears 11 and 12 without providing bearings separately from the oscillating gears 11 and 12.

Each elements generate heat due to the meshing between the internal tooth pins 6 and the oscillating gears 11 and 12, the sliding friction between the case 2 and the carriers 13 and 14, the sliding friction between the carriers 13 and 14 and the output shaft 9, and the sliding friction the bearings 15a to 15d, and the like. The input crankshaft 8 and the output shafts 9 are made of, for example, an aluminum alloy. The thermal conductivity of the input crankshaft 8 and the output shafts 9 is higher than that of the oscillating gears 11 and 12.

Therefore, the heat trapped inside the second speed reducing mechanism 1B is actively transferred to the input crankshaft 8 and the output shafts 9. For example, the heat of the bearings 15a to 15d and the heat of the oscillating gears 11 and 12 are actively transferred to the input crankshaft 8. Heat is accumulated in the oscillating gears 11 and 12 by the heat of the internal tooth pins 6, the third bearing 15c, and the fourth bearing 15d transferred to the oscillating gears 11 and 12 and the heat of the oscillating gears 11 and 12 themselves, but this heat is actively is transferred to the output shaft 9.

The heat transferred to the input crankshaft 8 spreads over the entire axial length of the crankshaft and is transferred to the first end portion 8a and the second end portion 8b. Heat is dissipated through the end portions 8a and 8b. Since the second end portion 8b faces the convex portion 111a of the first arm 111 with the minute gap therebetween, the heat of the second end portion 8b is also transferred to the first arm 111. Since the first arm 111 is made of, for example, an aluminum alloy, its thermal conductivity is higher than that of the input crankshaft 8 and the output shaft 9. In this way, the heat transferred from the input crankshaft 8 to the first arm 111 is effectively released.

The heat transferred to the output shaft 9 spreads over the entire axial length of the shaft and is transferred to the first end portion 9a and the second end portion 9b. Heat is dissipated through the end portions 9a and 9b. The concave portion 16 is formed in the second carrier 14 around the second end portion 9b of the output shaft 9. The concave portion 16 is filled with grease. The first arm 111 is arranged such that it blocks the opening of the concave portion 16 filled with the grease, that is, it overlaps the surface 14c of the second carrier 14. Thus, the heat of the second end portion 9b of the output shaft 9 is efficiently transferred to the first arm 111 through the grease. Therefore, the heat transferred from the output shaft 9 to the first arm 111 is effectively released.

The case 2 is made of, for example, an aluminum alloy. The internal tooth pins 6 can be made of a metal material, a high-thermal-conductivity resin, a non-metallic material, or the like. The oscillating gears 11 and 12 are made of, for example, resin. The thermal conductivity of the case 2 is higher than the thermal conductivity of the oscillating gears 11 and 12. The thermal conductivity of the internal tooth pins 6 is higher than the thermal conductivity of the oscillating gears 11 and 12. Thus, the heat generated by the meshing between the internal tooth pins 6 and the oscillating gears 11 and 12 can be actively transferred to the case 2 and the internal tooth pins 6. Therefore, it is possible to prevent the heat accumulation inside the second speed reducing mechanism 1B.

The heat dissipation effect as described above is the same for the first speed reducing mechanism 1A and the third speed reducing mechanism 1C. The heat accumulated inside the first speed reducing mechanism 1A and the third speed reducing mechanism 1C is released through the input crankshaft 8 and the output shafts 9. The heat is transferred to the rotating head 102, the second arm 112 and the like via the input crankshaft 8 and the output shafts 9, and the heat is effectively released. The case 2 and the internal tooth pins 6 prevent heat from being trapped inside the speed reducing mechanisms 1A and 1C.

Thus, in the speed reducing mechanisms 1A, 1B, and 1C described above, the surface roughness Ra of the inner peripheral surfaces of the respective carriers 13 and 14, which are rotating members, defining the output shaft holes 13b and 14b is equal to or less than 1.6 μm. The static friction coefficient of the inner peripheral surfaces of the output shaft holes 13b and 14b against the output shaft 9 is equal to or lower than 0.2. Similarly, the surface roughness Ra of the inner peripheral surfaces of the oscillating gears 11 and 12, which are the rotating members, defining the output shaft insertion holes 25a and 25b, respectively, is equal to or less than 1.6 μm. The static friction coefficient of the inner peripheral surfaces of the output shaft insertion holes 25a and 25b against the output shaft 9 equal to or less than 0.2.

Therefore, the output shaft 9 can be smoothly rotatably supported by the carriers 13 and 14 without providing bearings separately from the carriers 13 and 14. The output shaft 9 is smoothly brought into contact with the oscillating gears 11 and 12 without providing bearings separately from the oscillating gears 11 and 12. The PV limit of each carrier 13, 14 and each oscillating gear 11, 12 can be increased. Therefore, the speed reducing mechanisms 1A, 1B, and 1C can be stably operated, which extends the product life.

Since it is not necessary to provide bearings for the contact between the carriers 13 and 14 and the oscillating gears 11 and 12 and the output shaft 9, the speed reducing mechanisms 1A, 1B and 1C can be made smaller in size. Further, the linear expansion coefficient of each carrier 13, 14 is, for example, greater than that of aluminum alloy (23 to 24 ($\times 10^{-6}/°$ C.)). Whereas the output shaft 9 is made of, for example, an aluminum alloy. Therefore, even if the temperature of each carrier 13, 14 rises by driving the speed reducing mechanisms 1A, 1B and 1C, the outer diameter of the output shaft 9 may become too large for the inner diameter of the output shaft holes 13b, 14b. The output shaft 9 can be smoothly rotatably supported by the carriers 13 and 14.

The output shaft 9 is inserted into the output shaft holes 13b and 14b of the carriers 13 and 14, respectively. Therefore, compared to the case where the output shaft 9 is press-fitted into the carriers 13 and 14 and fixed therein, the work efficiency in assembling and disassembling the speed reduction mechanisms 1A, 1B and 1C can be improved.

By forming the carriers 13 and 14 and the oscillating gears 11 and 12 of resin, the surface roughness Ra of the inner peripheral surfaces of the carriers and the oscillating gears defining the output shaft holes 13b and 14b and the output shaft insertion holes 25a and 25b, respectively, can be easily adjusted to equal to or less than 1.6 μm. The static friction coefficient of the inner peripheral surfaces of the carriers and the oscillating gears defining the output shaft holes 13b and 14b and the output shaft insertion holes 25a and 25b against the output shaft 9 equal to or less than 0.2. By forming the output shaft 9 of metal, the rigidity of the output shaft 9 can be increased. Therefore, the speed reducing mechanisms 1A, 1B, and 1C can be operated more stably, and the product life can be extended.

In the eccentric oscillating-type speed reducing mechanism (speed reducing mechanism 1A, 1B, 1C), the first carrier 13 having the output shaft holes 13b, 14b and the second carrier 14 having the output shaft insertion holes 25a, 25b as described above are used. As a result, the drive efficiency can be improved while downsizing the speed reducing mechanisms 1A, 1B, and 1C. Moreover, the PV limit of each carrier 13, 14 and each oscillating gear 11, 12 can be easily increased, and the rigidity of the output shaft 9 can also be increased. Therefore, the speed reducing mechanisms 1A, 1B, and 1C can be stably operated. The product life of the speed reducing mechanisms 1A, 1B, and 1C can be extended.

The elastic shim 42 and the spacer 43 are attached to the first end portion 9a of the output shaft 9. Therefore, positioning of the output shaft 9 relative to the carriers 13 and 14 can be performed easily and accurately. The elastic shims 42 and the spacers 43 can absorb manufacturing errors of the case 2, the carriers 13 and 14, and the output shaft 9. The elastic shim 42 and the spacer 43 help positional adjustment of the output shaft 9 relative to the carriers 13 and 14.

Since two members (the elastic shim 42 and the spacer 43) are used for adjusting the position of the output shaft 9, it is possible to increase the variety of positional adjustment methods by combining these two members. Therefore, it is possible to more easily and accurately arrange the output shaft 9 relative to the carriers 13 and 14, and to reduce unnecessary movement of the output shaft.

Among other things, the elastic shim 42 is elastically deformable. By compressing and deforming the elastic shim 42 slightly in the axial direction and attaching it, the restoring force of the elastic shim 42 can bias the first carrier 13 toward the second carrier 14. This prevents unnecessary movement or rattling of the carriers 13 and 14 and the output shaft 9. Even if the axial play of the output shaft 9 relative to the carriers 13 and 14 increases due to aged deterioration or the like, this play can be absorbed by the elastic shims 42. By biasing the first carrier 13 toward the second carrier 14 side, preload can be applied to the bearings 15a and 15b disposed in the input shaft holes 13a and 14a of the carriers 13 and 14, respectively.

In the speed reducing mechanisms 1A, 1B, and 1C, the thermal conductivity of the case 2 is higher than the thermal conductivity of the oscillating gears 11 and 12. Therefore, the heat inside the speed reducing mechanisms 1A, 1B, and 1C can be efficiently released via the case 2. By making the thermal conductivity of the case 2 higher than that of the internal tooth pins 6, the heat trapped in the internal tooth pins 6 can be actively transferred to the case 2. Thus, the heat inside the speed reducing mechanisms 1A, 1B, and 1C can be efficiently released via the case 2.

By using the speed reducing mechanisms 1A, 1B, and 1C as described above for the joints 106a, 106b, and 106c, respectively, of the cooperative robot 100, the operation of the cooperative robot 100 can be stabilized. The product life of the cooperative robot 100 can be extended.

In the above first embodiment, the elastic shim 42 and the spacer 43 are provided on the first end portion 9a side of the output shaft 9 has been described. However, the configuration is not limited to this. The elastic shim 42 and the spacer 43 may be provided on the second end portion 9b side of the output shaft 9. The elastic shim 42 and spacer 43 may be provided on both ends 9a and 9b of the output shaft 9. Either only the elastic shim 42 or the spacer 43 may be provided.

Second Embodiment

<Speed Reducing Mechanism>

Figure 3:
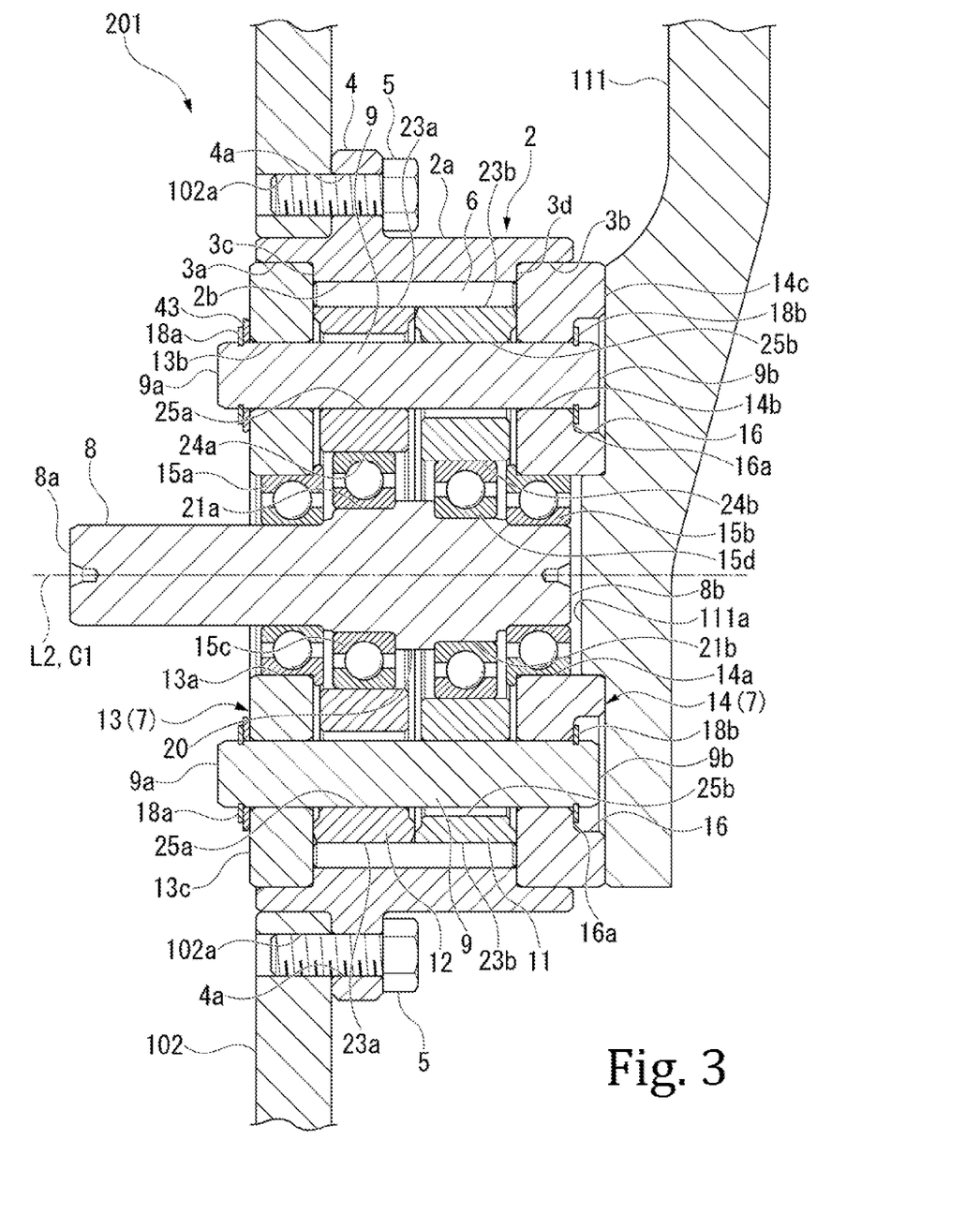
FIG. 3 schematically illustrates a configuration of a speed reducing mechanism in a second embodiment of the disclosure.

The following describes a second embodiment of the present disclosure with reference to FIG. 3 and by referring to FIG. 1. FIG. 3 schematically illustrates the configuration of a speed reducing mechanism 201 in the second embodiment. Elements and components similar to those of the first embodiment are referred to using the same referral numerals. In the following description of the second embodiment, the same labels as the first embodiment are used description thereof will be omitted.

As shown in FIG. 1, the second embodiment is similar to the above-described first embodiment in that the speed reducing mechanism 201 is used in the cooperative robot 100. As shown in FIG. 2, the speed reducing mechanism 201 of the second embodiment is an eccentric oscillating-type speed reducing mechanism, and includes the case 2, the carrier 7, the input crankshaft 8, the output shaft 9, and the oscillating gears 11 and 12, similarly to the speed reduction mechanisms 1A, 1B and 1C of the first embodiment described above.

The difference between the above-described first embodiment and the second embodiment is that the elastic shim 42 is provided on the first end portion 9a side of the output shaft 9 in the first embodiment, whereas the elastic shim 42 is not provided in the second embodiment. That is, the shim receiving recess 41 (see FIG. 2) is not formed in the surface 13c of the first carrier 13, and the whole surface 13c of the first carrier 13 is flat. Only the spacer 43 is provided on the first end portion 9a side of the output shaft 9. Even in this case, the same effect as that of the above-described first embodiment is obtained.

The present disclosure s not limited to the above embodiments but encompasses various modifications of the above embodiments not departing from the purport of the present disclosure. For example, the above-described embodiment described the case where the reducing mechanisms 1A to 1C and 201 are used in the cooperative robot 100 as a robot. However, the embodiments are not intended to this. The configurations of the above-described embodiments can be adopted for various robots having different configurations provided that the robot includes two members (first member and second member), and a speed reducing mechanisms 1A to 1C and 201 disposed between the two members, and the second member rotates relative to the first member.

In the above embodiments, the speed reducing mechanisms 1A to 1C and 201 have been described as an example of the gear mechanism. However, the gear mechanism is not limited to these. In place of the speed reducing mechanisms 1A to 1C, the configuration of the above-described embodiments can be adopted for various gear mechanisms that have two gears meshed with each other and the rotational force is transmitted to one of the two gears, or have the shaft to which the rotational force of the one gear is transmitted.

In the above-described embodiments, the speed reducing mechanisms 1A to 1C and 201 are so-called eccentric oscillating-type speed reducing mechanisms, and each speed reducing mechanism has the single center crankshaft (input crankshaft 8) coaxial with the central axis C1 of the case 2. However, the embodiments are not limited to this. The eccentric oscillating-type speed reducing mechanism may be configured to oscillatory rotate the oscillating gears 11 and 12 by rotating two or more input crankshafts 8 in conjunction with each other. In this case, the input crankshafts 8 rotate while they revolve around the center axis C1 at the same time.

The cooperative robot 100 described above uses the servomotors 107, 108, and 109 as drive sources. However, the drive source is not limited to this, and various drive sources such as other electric motors, hydraulic motors, engines, or the like may be used in place of the servomotor.

In the above embodiments, the carriers 13 and 14 are made of resin. However, the carriers may be configured in different ways, provided that the surface roughness Ra of the inner peripheral surfaces of the carriers defining the output shaft holes 13b and 14b is equal to or less than 1.6 μm, and the static friction coefficient of the inner peripheral surfaces of the carriers defining the output shaft holes 13b and 14b against the output shaft 9 equal to or less than 0.2.

For example, the carriers 13 and 14 may be made of a material other than resin, and the inner peripheral surfaces of the carriers defining the output shaft holes 13b and 14b may be coated with fluorine resin. Alternatively, only the portions of the carriers 13 and 14 where surround the output shaft 9 including at least the inner peripheral surfaces defining the output shaft holes 13b and 14b may be made of resin. Alternatively, each carrier may be made of sintered metal or casting. Only the portions of the carriers where surround the output shaft 9 including the inner peripheral surfaces defining the output shaft holes 13b and 14b may be made of sintered metal or casting.

In the above-described embodiment, the elastic shim 42 and the spacer 43 have the annular shapes. They are provided on the first end portion 9a of the output shaft 9 in the above embodiment. However, the configuration is not limited to this, and they can have any shape as long as manufacturing errors of the case 2, the carriers 13 and 14, and the output shaft 9 can be absorbed by the elastic shim 42 and the spacer 43. Any shape may be adopted as long as the position of the output shaft 9 relative to the carriers 13 and 14 can be adjusted by the elastic shim 42 and the spacer 43. For example, the elastic shim 42 and the spacer 43 may be formed in a U-shape. In this case, for example, the shim receiving recess 41 formed in the first carrier 13 may be configured to accommodate not only the elastic shim 42 but also the spacer 43. Such a configuration can prevent the elastic shim 42 and the spacer 43 from coming off regardless of the shapes of the elastic shims 42 and the spacers 43.

In the embodiments disclosed herein, a member formed of multiple components may be integrated into a single component, or conversely, a member formed of a single component may be divided into multiple components. Irrespective of whether or not the constituent parts are integrated, they are acceptable as long as they are configured to solve the problems.

What is claimed is:

1. A rotation mechanism, comprising:
a case having an inner peripheral surface;
a plurality of internal tooth pins arranged on the inner peripheral surface of the case along a circumferential direction;
an oscillating gear having external teeth meshing with the internal tooth pins, the oscillating gear being oscillatory rotated;
an input crankshaft having an eccentric portion that rotatably supports the oscillating gear;
an output shaft to which a rotational force of the oscillating gear is transmitted; and
a carrier having a shaft insertion hole in which the output shaft is inserted, the output shaft configured to contact an inner peripheral surface of the shaft insertion hole, wherein the carrier is rotatable relative to the output shaft,
wherein the carrier includes a support member configured to support each axial end portion of the output shaft rotatably,
wherein the input crankshaft is configured to transmit a rotational force to the oscillating gear,
wherein the shaft insertion hole includes a gear-side shaft hole formed in the oscillating gear and a support member-side shaft hole formed in the support member,
wherein a surface roughness Ra of the inner peripheral surface of the shaft insertion hole is equal to or less than 1.6 μm, and
wherein a static friction coefficient of the inner peripheral surface of the shaft insertion hole against the output shaft is equal to or less than 0.2.

2. The rotation mechanism of claim 1, wherein the carrier has a portion which at least includes the inner peripheral surface of the shaft insertion hole and surrounds the output shaft,
wherein the portion is made of resin, and
wherein the output shaft is made of metal.

3. The rotation mechanism of claim 1, further comprising a shim provided on at least one of two axial end portions of the output shaft, and
wherein the shim is configured to help axial positioning of the output shaft.

4. The rotation mechanism of claim 3, wherein the shim includes an elastic shim that is elastically deformable.

5. The rotation mechanism of claim 4, wherein the shim has an annular spacer into which the output shaft is inserted.

6. The rotation mechanism of claim 4,
wherein a thermal conductivity of the case is higher than a thermal conductivity of the oscillating gear.

7. The rotation mechanism of claim 4,
wherein a thermal conductivity of the case is higher than a thermal conductivity of the internal tooth pins.

8. The rotation mechanism of claim 3, wherein the shim has an annular spacer into which the output shaft is inserted.

9. The rotation mechanism of claim 8,
wherein a thermal conductivity of the case is higher than a thermal conductivity of the oscillating gear.

10. The rotation mechanism of claim 8,
wherein a thermal conductivity of the case is higher than a thermal conductivity of the internal tooth pins.

11. The rotation mechanism of claim 3,
wherein a thermal conductivity of the case is higher than a thermal conductivity of the oscillating gear.

12. The rotation mechanism of claim 3,
wherein a thermal conductivity of the case is higher than a thermal conductivity of the internal tooth pins.

13. The rotation mechanism of claim 1,
wherein a thermal conductivity of the case is higher than a thermal conductivity of the oscillating gear.

14. The rotation mechanism of claim 1,
wherein a thermal conductivity of the case is higher than a thermal conductivity of the internal tooth pins.

15. A rotation mechanism, comprising:
a case having an inner peripheral surface;
a plurality of internal tooth pins arranged on the inner peripheral surface of the case along a circumferential direction;

an oscillating gear having external teeth meshing with the internal tooth pins, the oscillating gear being oscillatory rotated, the oscillating gear being made of resin;
an input crankshaft configured to transmit a rotational force to the oscillating gear, the input crankshaft being made of metal;
an output shaft to which a rotational force of the oscillating gear is transmitted, the output shaft being made of metal; and
a carrier including a support member, the support member configured to support each axial end portion of the output shaft rotatably, the support member being made of resin,
wherein the carrier has a shaft insertion hole in which the output shaft is inserted, the output shaft configured to contact an inner peripheral surface of the shaft insertion hole,
wherein the shaft insertion hole includes a gear-side shaft hole formed in the oscillating gear and a support member-side shaft hole formed in the support member, and
wherein the input crankshaft has an eccentric portion that rotatably supports the oscillating gear.

16. A robot, comprising:
a first member and a second member; and
a rotation mechanism provided between the first member and the second member,
wherein the rotation mechanism rotates the second member relative to the first member,
wherein the rotation mechanism includes:
  a case having an inner peripheral surface;
  a plurality of internal tooth pins arranged on the inner peripheral surface of the case along a circumferential direction;
  an oscillating gear having external teeth meshing with the internal tooth pins, the oscillating gear being oscillatory rotated, the oscillating gear being made of resin;
  an input crankshaft configured to transmit a rotational force to the oscillating gear, the input crankshaft being made of metal;
  an output shaft to which a rotational force of the oscillating gear is transmitted, the output shaft being made of metal; and
  a carrier including a support member, the support member configured to support each axial end portion of the output shaft rotatably, the support member being made of resin,
wherein the carrier has a shaft insertion hole in which the output shaft is inserted, the output shaft configured to contact an inner peripheral surface of the shaft insertion hole,
wherein the shaft insertion hole includes a gear-side shaft hole formed in the oscillating gear and a support member-side shaft hole formed in the support member, and
wherein the input crankshaft has an eccentric portion that rotatably supports the oscillating gear.

\* \* \* \* \*